United States Patent
Kim et al.

(10) Patent No.: US 11,188,150 B2
(45) Date of Patent: Nov. 30, 2021

(54) HAPTIC TOOL SYSTEM

(71) Applicant: Korea University of Technology and Education Industry-University Cooperation Foundation, Cheonan-si (KR)

(72) Inventors: Sang-Youn Kim, Seoul (KR); Dong-soo Choi, Cheonan-si (KR); Seung Young Yang, Sejong-si (KR); Sun-Young Shin, Cheonan-si (KR); YeongSeok Do, Cheonan-si (KR); SiHo Ryu, Cheongju-si (KR); Sang Man Seong, Cheonan-si (KR); In-Hee Song, Cheonan-si (KR); Tae-Heon Yang, Chungju-si (KR)

(73) Assignee: KOREA UNIVERSITY OF TECHNOLOGY AND EDUCATION INDUSTRY-UNIVERSITY COOPERATION FOUNDATION, Cheonan-si (KR)

( * ) Notice: Subject to any disclaimer, the term of this patent is extended or adjusted under 35 U.S.C. 154(b) by 0 days.

(21) Appl. No.: 16/185,707

(22) Filed: Nov. 9, 2018

(65) Prior Publication Data
US 2019/0196590 A1 Jun. 27, 2019

(30) Foreign Application Priority Data
Dec. 22, 2017 (KR) .................. 10-2017-0178883

(51) Int. Cl.
*G06F 3/01* (2006.01)
*G06F 3/0354* (2013.01)
(Continued)

(52) U.S. Cl.
CPC .............. *G06F 3/016* (2013.01); *G06F 3/038* (2013.01); *G06F 3/03545* (2013.01); *G06F 3/044* (2013.01); *G09B 19/24* (2013.01)

(58) Field of Classification Search
CPC ....... G06F 3/016; G06F 3/044; H05K 3/0044; G05B 2219/40122
(Continued)

(56) References Cited

U.S. PATENT DOCUMENTS

| 7,084,867 B1 * | 8/2006 | Ho .......................... G06F 3/016 345/419 |
| 10,268,273 B1 * | 4/2019 | Sundaram ............... G06F 3/016 |

(Continued)

FOREIGN PATENT DOCUMENTS

| KR | 1020030024358 A | 3/2003 |
| KR | 1020090064968 A | 6/2009 |

OTHER PUBLICATIONS

Iwata, "Pen-Based Haptic Virtual Environment" Proceedings of IEEE Virtual Reality Annual International Symposium, Sep. 18-22, 1993, Seattle, Wash, pp. 287-292 (Year: 1993).*

*Primary Examiner* — Yuzhen Shen
(74) *Attorney, Agent, or Firm* — STIP Law Group, LLC

(57) ABSTRACT

The present invention relates a haptic tool system, the system including: a computer device portion providing a content image including a target object for user testing or learning through a haptic feedback simulation function; and a haptic drill tool having an capacitive touch pen that makes contact with the target object and providing a haptic feedback simulating use of an actual drill to the user on the basis of load cell displacement information on a force applied according to the contact of the capacitive touch pen and physical property information on the target object. According to the haptic tool system, it is possible to provide the (Continued)

haptic feedback similar to a force and a motion sensation that the user feels when using an actual electric drill.

5 Claims, 5 Drawing Sheets

(51) Int. Cl.
*G09B 19/24* (2006.01)
*G06F 3/044* (2006.01)
*G06F 3/038* (2013.01)

(58) Field of Classification Search
USPC .......................................................... 345/179
See application file for complete search history.

(56) References Cited

U.S. PATENT DOCUMENTS

| | | | |
|---|---|---|---|
| 2012/0206419 A1* | 8/2012 | Lee | G06F 3/03545 345/179 |
| 2013/0307829 A1* | 11/2013 | Libin | G06F 3/016 345/179 |
| 2014/0198069 A1* | 7/2014 | Park | G06F 3/03545 345/173 |
| 2017/0108930 A1* | 4/2017 | Banerjee | G06F 3/016 |
| 2017/0177083 A1* | 6/2017 | Alghooneh | G06F 3/016 |
| 2018/0369691 A1* | 12/2018 | Rihn | A63F 13/211 |

* cited by examiner

FIG.4
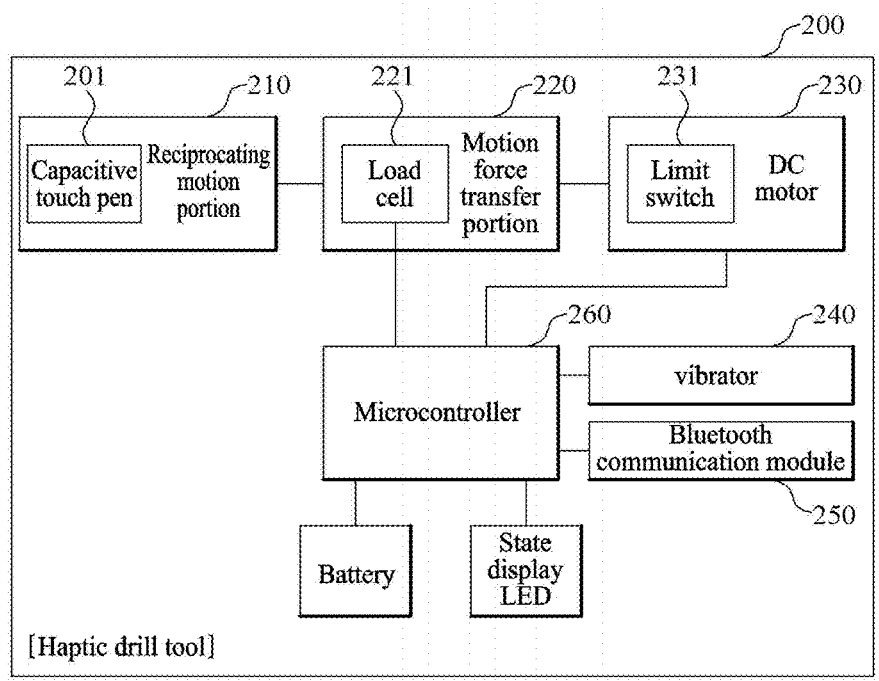
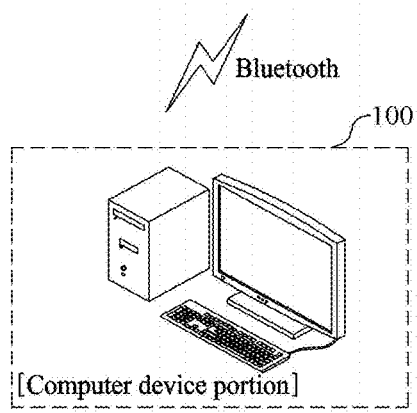

HAPTIC TOOL SYSTEM

CROSS REFERENCE TO RELATED APPLICATION

The present application claims priority to Korean Patent Application No. 10-2017-0178883, filed Dec. 12, 2017, the entire contents of which is incorporated herein for all purposes by this reference.

BACKGROUND OF THE INVENTION

Field of the Invention

The present invention relates to a haptic tool system and, more particularly, to a haptic tool system capable of receiving a haptic feedback of a force or a motion sensation that a user can feel when using an actual electric drill.

Description of the Related Art

Generally, haptics refers to a technology that enables a user to feel a touch sensation, a force, a motion sensation and so on via a user input device, such as a keyboard, a mouse, a joystick, a touch screen, and the like. The term haptics is derived from the Greek adjective "haptesthai" meaning touching, and is also referred to as a computer tactile technology.

In order to provide haptic feedback to a user, a mechanical module such as an actuator may be used. For example, an actuator is operated by a source of energy, such as electric current, hydraulic fluid pressure, or pneumatic pressure, etc. and converts that energy into a sort of motion. In recent years, a number of actuators equipped on the body of a user to provide a force feedback have been developed. In actuators intended to provide a force feedback that have been developed up to present, a vibration motor, a hydraulic or pneumatic pump, or the like is used to provide the force feedback to the user's body in most cases, as disclosed in Korean Patent Application Nos. 10-2001-0057470 and 10-2007-0132361.

With respect to the technology field of actuators of the related art, studies have focused mainly on improving the feedback of a touch sensation, a force, or a motion sensation that each actuator provides. However, there is not disclosed an integrated haptic tool system that feels like an actual tool for user testing or learning.

SUMMARY OF THE INVENTION

Accordingly, the present invention has been made keeping in mind the above problems occurring in the prior art, and an object of the present invention is to provide a haptic tool system that includes a computer device portion providing a content image including a target object for testing or learning through a haptic feedback simulation function, and a haptic drill tool having an capacitive touch pen that makes contact with the target object and providing haptic feedback like using an actual drill to the user on the basis of load cell displacement information on a force applied according to the contact of the capacitive touch pen and physical property information on the target object, whereby it is possible to provide the haptic feedback similar to a force and a motion sensation that the user feels when using an actual electric drill.

In addition, it is an object to provide a haptic tool system that is configured with a gun type haptic drill of the same or similar shape as an actual electric drill, thereby enabling testing or learning through a simulation function through a haptic feedback whereby a user may feel as if he or she were using an actual gun type electric drill.

In order to achieve the above-mentioned objects, a haptic tool system according to the present invention includes a computer device portion providing a content image including a target object for user testing or learning through a haptic feedback simulation function via a monitor and recognizing a corresponding position of the target object of the content image displayed on the monitor at the time of contact therewith to provide predetermined physical property information of the target object; and a haptic drill tool having an capacitive touch pen that makes contact with the target object of the content image displayed on the monitor of the computer device portion, and providing a haptic feedback simulating use of an actual drill to the user on the basis of load cell displacement information on a force applied according to the contact of the capacitive touch pen and the physical property information on the target object provided from the computer device portion.

Preferably, the computer device portion may include a monitor displaying the content image including the target object for testing or learning the haptic feedback simulation function and having a touch panel for sensing the contact of the capacitive touch pen of the haptic drill tool; a personal computer storing and controlling a plurality of content images to be displayed on the monitor and the physical property information of the target object included in the content image and recognizing the corresponding contact position on the monitor according to the contact of the capacitive touch pen; and a Bluetooth communication module for performing Bluetooth communication with the haptic drill tool for data transmission under the control of the personal computer.

More preferably, the haptic drill tool may include a reciprocating motion portion disposed at the rear end of the capacitive touch pen that makes contact with the target object of the content image displayed on the monitor of the computer device portion for transferring a force applied by the capacitive touch pen; a motion force transfer portion having a load cell disposed at a rear end of the reciprocating motion portion to receive a linear motion force through the reciprocating motion portion and to detect the load cell displacement information and converting the linear motion force into a rotational force to be transferred; a DC motor disposed at a rear end of the motion force transfer portion to provide a force feedback corresponding to a force torque of the rotational force; a vibrator providing a drilling sensation for the target object of the content image; a Bluetooth communication module receiving the physical property information on the target object via Bluetooth communication with the Bluetooth communication module of the computer device portion; and a microcontroller controlling an overall operation such that the user is provided with the haptic feedback based on the load cell displacement information from the load cell of the motion force transfer portion and physical property information of the target object.

Preferably, the reciprocal motion portion may have a coupling structure composed of a drill tip at which the capacitive touch pen is formed, and a magnet, a spring, a shaft, and a ball bush that are located at a rear end of the drill tip.

More preferably, the motion force transfer portion may have a coupling structure composed of a load cell for receiving a linear motion force transferred from the reciprocating motion portion, a ball screw coupled to the load cell, and a coupling coupled to a distal end of the ball screw.

More preferably, the motion force transfer portion may control a force of the ball screw in a reciprocating direction in correspondence with a rotational torque control of the DC motor.

According to the haptic tool system proposed in the present invention that includes a computer device portion providing a content image including a target object for testing or learning through a haptic feedback simulation function; and a haptic drill tool having an capacitive touch pen that makes contact with the target object and providing a haptic feedback simulating use of an actual drill on the basis of load cell displacement information on a force applied according to the contact of the capacitive touch pen and physical property information on the target object, it is possible to provide the haptic feedback similar to a force and a motion sensation that the user feels when using an actual electric drill.

In addition, according to the present invention, a haptic tool system is configured with a gun type haptic drill of the same or similar shape as an actual electric drill, thereby enabling a user to test or learn through a simulation function by a haptic feedback simulating what a user may feel when using an actual gun type electric drill.

BRIEF DESCRIPTION OF THE DRAWINGS

The above and other objects, features and other advantages of the present invention will be more clearly understood from the following detailed description when taken in conjunction with the accompanying drawings, in which:

FIG. 4 is a block diagram illustrating a function of a haptic drill tool of a haptic tool system according to an embodiment of the present invention;

DETAILED DESCRIPTION OF THE INVENTION

Figure 1:
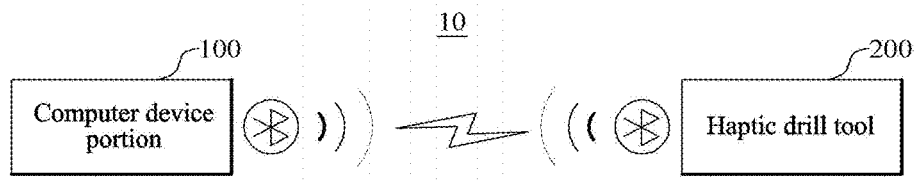
FIG. 1 is a view illustrating a conceptual configuration of a haptic tool system according to an embodiment of the present invention.

Hereinafter, preferred embodiments of the present invention will be described in detail with reference to the accompanying drawings so that those skilled in the art can easily carry out the present invention. In the following detailed description of the preferred embodiments of the present invention, a detailed description of known functions and configurations incorporated herein will be omitted when it may make the subject matter of the present invention rather unclear. The same reference numerals are used for portions having similar functions and configurations throughout the drawings.

In addition, throughout the specification, when a part is referred to as being "connected" to other part, it includes not only the case that the part is "directly connected" to the other part, but also the case that the part is "indirectly connected" to the other part with another device in between. In addition, "comprising any component" means that other components may be further included, rather than excluding other components, unless specifically stated otherwise.

Figure 2:
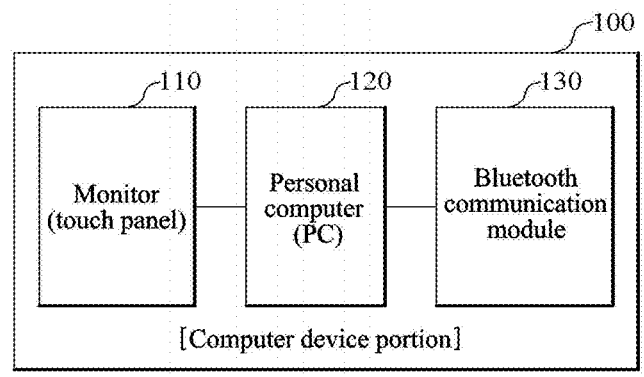
FIG. 2 is a view illustrating a configuration of a computer device portion of a haptic tool system according to an embodiment of the present invention.
Figure 3:
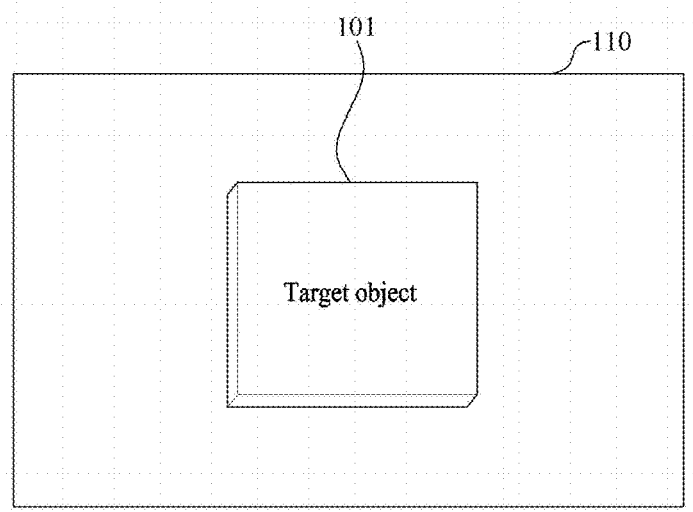
FIG. 3 is a view illustrating a content image including a target object displayed on a monitor of a computer device portion of a haptic tool system according to an embodiment of the present invention.
Figure 5:
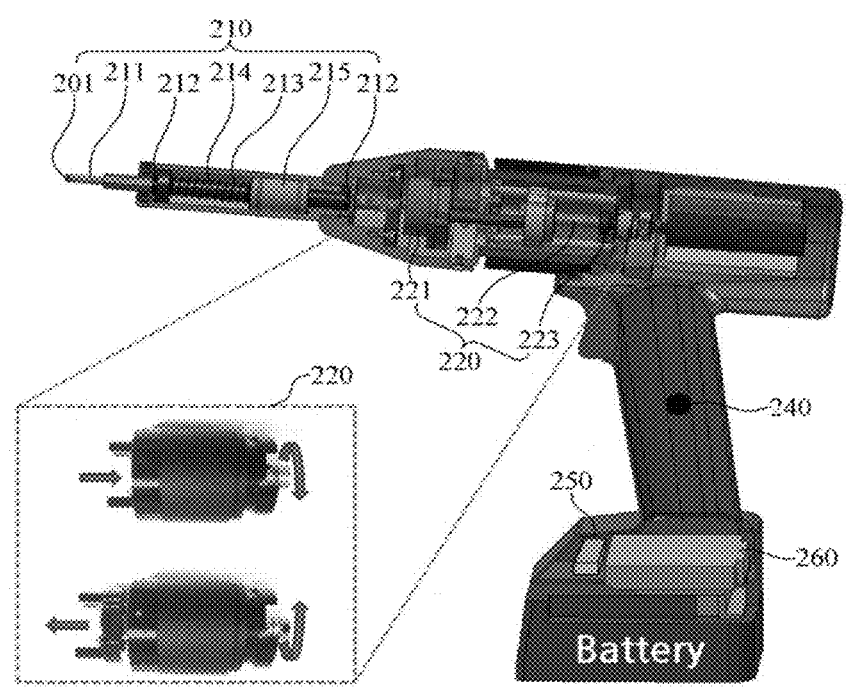
FIG. 5 is a view illustrating a schematic configuration of a haptic drill tool of a haptic tool system according to an embodiment of the present invention.
Figure 6:
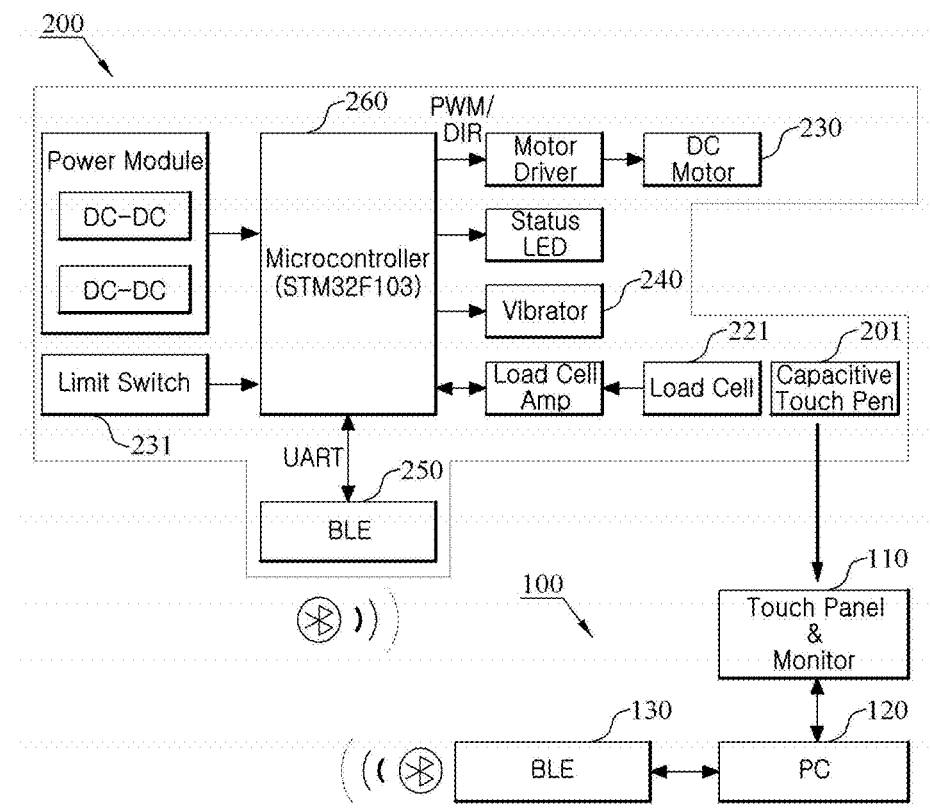
FIG. 6 is a conceptual block diagram illustrating operational procedures of a haptic tool system according to an embodiment of the present invention.

FIG. 1 is a view illustrating a conceptual configuration of a haptic tool system according to an embodiment of the present invention, FIG. 2 is a view illustrating a configuration of a computer device portion of a haptic tool system according to an embodiment of the present invention, FIG. 3 is a view illustrating a content image including a target object displayed on a monitor of a computer device portion of a haptic tool system according to an embodiment of the present invention, FIG. 4 is a block diagram illustrating a function of a haptic drill tool of a haptic tool system according to an embodiment of the present invention, FIG. 5 is a view illustrating a schematic configuration of a haptic drill tool of a haptic tool system according to an embodiment of the present invention, and FIG. 6 is a conceptual block diagram illustrating operational procedures of a haptic tool system according to an embodiment of the present invention. As shown in FIGS. 1 to 6, a haptic tool system 10 according to an embodiment of the present invention may be configured to include a computer device portion 100 and a haptic drill tool 200.

The computer device portion 100 provides a content image including the target object 101 for user testing or learning through a haptic feedback simulation function via a monitor 110, and recognizes the corresponding position of the target object 101 of the content image displayed on the monitor 110 according to the contact thereon to provide predetermined physical property information of the target object 101 to the haptic drill tool 200 that will be described later. As shown in FIG. 2, the computer device portion 100 may perform Bluetooth wireless communication with the haptic drill tool 200. Here, the target object 101, which is to be used for user testing or learning through the haptic feedback simulation function, may be configured to have soft or hard material properties such as hardnesses and thicknesses different from each other. That is, the target objects 101 included in the content image are configured such that the user may feel a force or a motion sensation according to the physical property information of each object, which may be generated at the time of using the actual drill. This target object 101 may include a type of wood or metal that may be used when actually performing drilling.

In addition, as shown in FIG. 2, The computer device portion 100 is configured to include a monitor 110 that displays the content image including the target object 101 for user testing or learning through the haptic feedback simulation function and has a touch panel for sensing the contact of an capacitive touch pen 201 of the haptic drill tool 200; a personal computer 120 storing and controlling a plurality of content images to be displayed on the monitor 110 and physical property information of the target object 101 included in the content image and recognizing the corresponding contact position on the monitor 110 according to the contact of the capacitive touch pen 201; and a Bluetooth communication module 130 for performing Bluetooth communication with the haptic drill tool 200 for data transmission under the control of the personal computer 120.

The haptic drill tool 200 is a haptic device that is configured to include an capacitive touch pen 201 that makes contact with the target object 101 of a content image displayed on a monitor 110 of the computer device portion 100, and provide haptic feedback simulating using an actual drill to the user on the basis of load cell displacement information on the force applied according to the contact of the capacitive touch pen 201 and the physical property information on the target object 101 provided from the computer device portion 100. As shown in FIG. 5, the haptic drill tool 200 may be configured as a hand-held gun type electric drill. Here, the haptic drill tool 200 may be used for user testing or learning through haptic feedback simulation function simulating what the user may feel when using an actual drill and may be connected to the computer device portion 100 via Bluetooth communication.

In addition, as shown in FIG. 4, the haptic drill tool 200 is configured to include a reciprocating motion portion 210 that is disposed at the rear end of the capacitive touch pen 201 making contact with the target object 101 of the content image displayed on the monitor 110 of the computer device portion 100 for transferring force that the capacitive touch pen 201 applies; a motion force transfer portion 220 that includes a load cell 221 disposed at the rear end of the reciprocating motion portion 210 to receive a linear motion force through the reciprocating motion portion 210 and to detect a load cell displacement information and converts the linear motion force into a rotational force to be transferred; a DC motor 230 that is disposed at the rear end of the motion force transfer portion 220 to provide a force feedback corresponding to a torque of the rotational force; a vibrator 240 for providing a drilling sensation for the target object 101 of the content image; a Bluetooth communication module 150 that receives physical property information on the target object 101 via Bluetooth communication with the Bluetooth communication module 130 of the computer device portion 100; and a microcontroller 260 that controls the overall operation to provide the user with a haptic feedback based on the load cell displacement information from the load cell 221 of the motion force transfer portion 220 and the physical property information of the target object 101. As shown in FIGS. 4 and 6, the haptic drill tool 200 includes a battery (not shown) for supplying power and an LED (not shown) for indicating an operation state of the haptic drill tool 200. Here, the DC motor 230 may be configured with a geared motor including a transmission gear and a reduction gear, and a limit switch 231 may be connected to a shaft of the DC motor 230. More specifically, the motion force transfer portion 220 may control the force of the ball screw 222 in the reciprocating direction in correspondence with a rotational torque control of the DC motor 230, through which the force feedback for the target object 101 may be provided to the user.

In addition, as shown in FIG. 5, the reciprocating motion portion 210 may have a coupling structure composed of a drill tip 211 at which the capacitive touch pen 201 is formed, and a magnet 212, a spring 213, a shaft 214, and a ball bush 215 that are located at the rear end of the drill tip 211. Here, the reciprocating motion portion 210 linearly moves forward and backward according to force applied by causing the capacitive touch pen 201 to make contact with the target object 101 of the monitor 110 by a user.

In addition, as shown in FIG. 5, the motion force transfer portion 220 has a coupling structure composed of a load cell 221 for receiving a linear motion force transferred from the reciprocating motion portion 210, a ball screw 222 coupled to the load cell 221, and a coupling 223 coupled to the distal end of the ball screw 222. Here, the motion force transfer portion 220 may control the force of the ball screw 222 in the reciprocating direction in correspondence with a rotational torque control of the DC motor 230.

In addition, the vibrator 240 is a vibrating motor mounted in a handle of a gun type electric drill, and may provide a drilling sensation under the control of the microcontroller 260. Here, the haptic feedback simulating a drilling sensation may provide haptics of force or motion sensation simulating use of an actual drill, on the basis of physical property information of the target object 101, that is, information on a thickness and a material property, such as the softness or hardness of the material. That is, when the target object 101 has a specific thickness as a wood material, it is possible to provide drilling haptics for a specific time required to drill holes when actually performing drilling, whereby the user of the haptic drill tool 200 may perform learning while feeling like an actual drill.

In addition, the user of the haptic drill tool 200 may perform learning in a manner whereby it feels like an actual drill were used, and the user may also feel a degree of hardness of the corresponding object when making contact with a particular object. That is, the strength in correspondence with a rotational torque of the DC motor 230 when making contact with the capacitive touch pen 201 is transferred through the reciprocating motion portion 210 and the motion force transfer portion 220, whereby it is possible to transfer the force feedback for the degree of the hardness of the target object 101 to the user by controlling force in the reciprocating direction of the ball screw 222 of the motion force transfer portion 220.

FIG. 3 shows a content image including a target object displayed on a monitor of a computer device portion of a haptic tool system according to an embodiment of the present invention. In addition, FIG. 5 illustrates a schematic configuration of a haptic drill tool of a haptic tool system according to an embodiment of the present invention. FIG. 6 shows a conceptual block diagram illustrating operational procedures of a haptic tool system according to an embodiment of the present invention. FIG. 5 shows a structure of overall housing shape of the haptic drill tool 200 and an internal structure of partial cut-out portions thereof. FIG. 6 shows a block diagram illustrating operation procedures for testing or learning the haptic feedback simulation function between the computer device portion 100 and the haptic drill tool 200.

As described above, the haptic tool system according to an embodiment of the present invention includes the computer device portion providing the content image including the target object for testing or learning the haptic feedback simulation function and the haptic drill tool having the capacitive touch pen that makes contact with the target object and providing a haptic feedback simulating use of an actual drill to the user on the basis of the load cell displacement information on the force applied according to the contact of the capacitive touch pen and physical property information on the target object, whereby it is possible to provide the haptic feedback of a force and a motion sensation that the user feels when using an actual electric drill, and particularly, by configuring a gun type haptic drill tool of the same or similar shape as an actual electric drill, it enables the user to test or learn through the simulation function through a haptic feedback simulating what a user may feel when using an actual gun type electric drill.

The present invention may be embodied in many other specific forms without departing from the spirit or essential characteristics of the invention.

What is claimed is:

1. A haptic tool system, comprising:
a computer device portion having a monitor, wherein the monitor displays a content image and the content image is an image of a target object for user testing or learning through a haptic feedback simulation function, and recognizing a corresponding position of the target object to provide predetermined physical property information of the target object; and
a haptic drill tool having a capacitive touch pen, wherein the capacitive touch pen makes a physical contact with the content image displayed on the monitor, and providing a haptic feedback simulating a use of an actual drill to a user on the basis of load cell displacement information of a force applied by the capacitive touch pen on the monitor and the physical property information of the target object,
wherein
the monitor has a touch panel for sensing the physical contact of the capacitive touch pen of the haptic drill tool,
the haptic drill tool provides the haptic feedback similar to a force and a motion sensation that the user feels when using the actual drill, and
the computer device portion recognizes the corresponding position of the target object at the time of the contact,
wherein the haptic drill tool further includes,
a reciprocating motion portion disposed at a rear end of the capacitive touch pen that makes contact with the target object of the content image displayed on the monitor of the computer device portion for transferring a force applied by the capacitive touch pen;
a motion force transfer portion having a load cell disposed at a rear end of the reciprocating motion portion to receive a linear motion force through the reciprocating motion portion and to detect the load cell displacement information and converting the linear motion force into a rotational force to be transferred;
a DC motor disposed at a rear end of the motion force transfer portion to provide a force feedback corresponding to a force torque of the rotational force;
a vibrator providing a drilling sensation for the target object of the content image;
a Bluetooth communication module receiving the physical property information on the target object via Bluetooth communication with the Bluetooth communication module of the computer device portion; and
a microcontroller controlling an overall operation such that the user is provided with the haptic feedback based on the load cell displacement information from the load cell of the motion force transfer portion and physical property information of the target object.

2. The system of claim 1, wherein the computer device portion includes:
a personal computer storing and controlling a plurality of content images to be displayed on the monitor and the physical property information of the target object included in the content image and recognizing the corresponding contact position on the monitor according to the contact of the capacitive touch pen; and
a Bluetooth communication module for performing Bluetooth communication with the haptic drill tool for data transmission under the control of the personal computer.

3. The system of claim 1, wherein the reciprocal motion portion has a coupling structure composed of a drill tip at which the capacitive touch pen is formed, and a magnet, a spring, a shaft, and a ball bush that are located at a rear end of the drill tip.

4. The system of claim 1, wherein the motion force transfer portion has a coupling structure composed of a load cell for receiving a linear motion force transferred from the reciprocating motion portion, a ball screw coupled to the load cell, and a coupling coupled to a distal end of the ball screw.

5. The system of claim 4, wherein the motion force transfer portion controls a force of the ball screw in a reciprocating direction in correspondence with a rotational torque control of the DC motor.

* * * * *